United States Patent [19]
Henthorn

[11] Patent Number: 5,351,761
[45] Date of Patent: Oct. 4, 1994

[54] FIELD STONE COLLECTION APPARATUS

[76] Inventor: Clyde E. Henthorn, 6100 County Rd. 23, Mt. Gilead, Ohio 43338

[21] Appl. No.: 94,750

[22] Filed: Jul. 22, 1993

[51] Int. Cl.$^5$ ............................................. A01D 15/04
[52] U.S. Cl. ........................................ 171/13; 171/46; 171/75; 171/78; 171/127; 171/132; 171/141; 171/144
[58] Field of Search ................ 171/13, 78, 75, 141, 171/143, 144, 46, 66, 71, 132, 109, 127

[56] References Cited

U.S. PATENT DOCUMENTS

| | | | |
|---|---|---|---|
| 437,593 | 9/1890 | Gohm | 171/78 |
| 565,181 | 8/1896 | Sadler | 171/75 |
| 600,403 | 3/1898 | Bullock | 171/78 X |
| 3,139,939 | 7/1964 | Vickery | 171/132 X |
| 5,069,293 | 12/1991 | St. Romain | 171/144 X |

Primary Examiner—Randolph A. Reese
Assistant Examiner—Christopher J. Novosad
Attorney, Agent, or Firm—Thomas S. Baker, Jr.

[57] ABSTRACT

A farm tractor field stone collection implement is provided with a forward dragbox section having open forward and aft ends, a perforated bottom, multiple spaced-apart teeth projected forwardly and downwardly from the section leading edge, and hitch points for coupling to a farm tractor implement hitch accessory, with an aft dragbox section having a forward open end aligned with the forward dragbox section open aft end, a perforated bottom, and an aft end from which collected field stone may be dumped, with a vibrator mounted on the forward dragbox section, and with fasteners joining the forward and aft dragbox sections in an articulated manner relative to each other.

4 Claims, 2 Drawing Sheets

1

FIELD STONE COLLECTION APPARATUS

FIELD OF THE INVENTION

This invention relates generally to apparatus for the collection of field stone from arable farmland, and particularly concerns a dragbox-type field stone collection implement which may be used in combination with a farm tractor having conventional implement hitch and power take-off accessories.

BACKGROUND OF THE INVENTION

It is well-known that agricultural lands utilized for growing crops, and having stones or rocks of substantial size situated on or in proximity to crop field surfaces, will be more productive and facilitate more-efficient farming operations if such stones or rocks can be collected and removed from the land that is to be tilled. The problem of field stone removal is generally more acute on farms located in northern climes subject to the alternate freezing and thawing that causes below-surface rocks and stones to rise upwards to the earth's surface.

Heretofore it has been common practice for farm operators to utilize non-specialized equipment, and even considerable manual labor, to effect field stone collection and removal. I have discovered that a dragbox-type field stone collection implement may be constructed and operated, particularly in combination with a farm tractor having a conventional implement hitch and a conventional power take-off, to greatly reduce the effort that is otherwise required to obtain desirable field stone removal. Through the use of such apparatus farming operations may be made more efficient.

SUMMARY OF THE INVENTION

To facilitate farming operations involving the collection and removal of field stone from fields that are to be cultivated I provide a tractor-towable dragbox that is basically three-sided in overall configuration and that is comprised of two separate but joined dragbox sections. An aft dragbox section has three sides and a steel plate bottom provided with perforations which permit any collected soil to be continuously sifted from containment within the aft section. A forward dragbox section has two sides and a steel plate bottom provided with perforations, and is connected to the aft dragbox section in a manner which permits articulation of the dragbox sections relative to each other. The forward dragbox section also is comprised of a mounted vibrator which may be coupled to a tractor power take-off, a grouping of spaced-apart, hardened steel tines or teeth which project downwardly and forwardly from the underside of the section steel plate bottom at its leading edge, and attach fittings for securing the joined dragbox sections to the implement hitch of a farm tractor.

Other features of my invention will become more apparent from consideration of the drawings and detailed description which follow.

DETAILED DESCRIPTION

Figure 1:
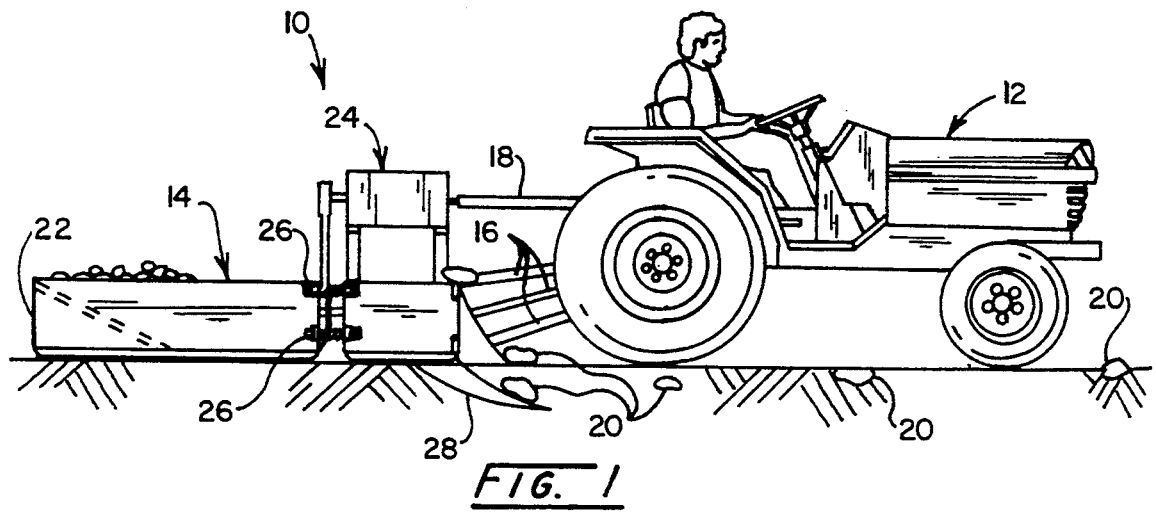
FIG. 1 is a side elevational view of a preferred embodiment of the farm implement of my invention illustrating that apparatus in coupled relation to a farm tractor during a field stone collection phase of apparatus operation.

FIG. 1 illustrates an equipment combination (10) comprised of farm tractor (12) and the stone collection apparatus (14) of my invention coupled to such tractor by means of tractor implement hitch elements (16) and tractor power take-off element (18). In the FIG. 1 arrangement such apparatus is shown being operated for the purpose of collecting the various field stones (20) which generally either lie upon, or are wholly or partially embedded in the soil below, the earth's surface. Also as shown in FIG. 1, the field stone collection implement (14), which is of the dragbox-type, is comprised of an aft section (22), a forward section (24), and multiple bolt couplings (26) which join sections (22 and 24) in an articulated manner.

Figure 2:
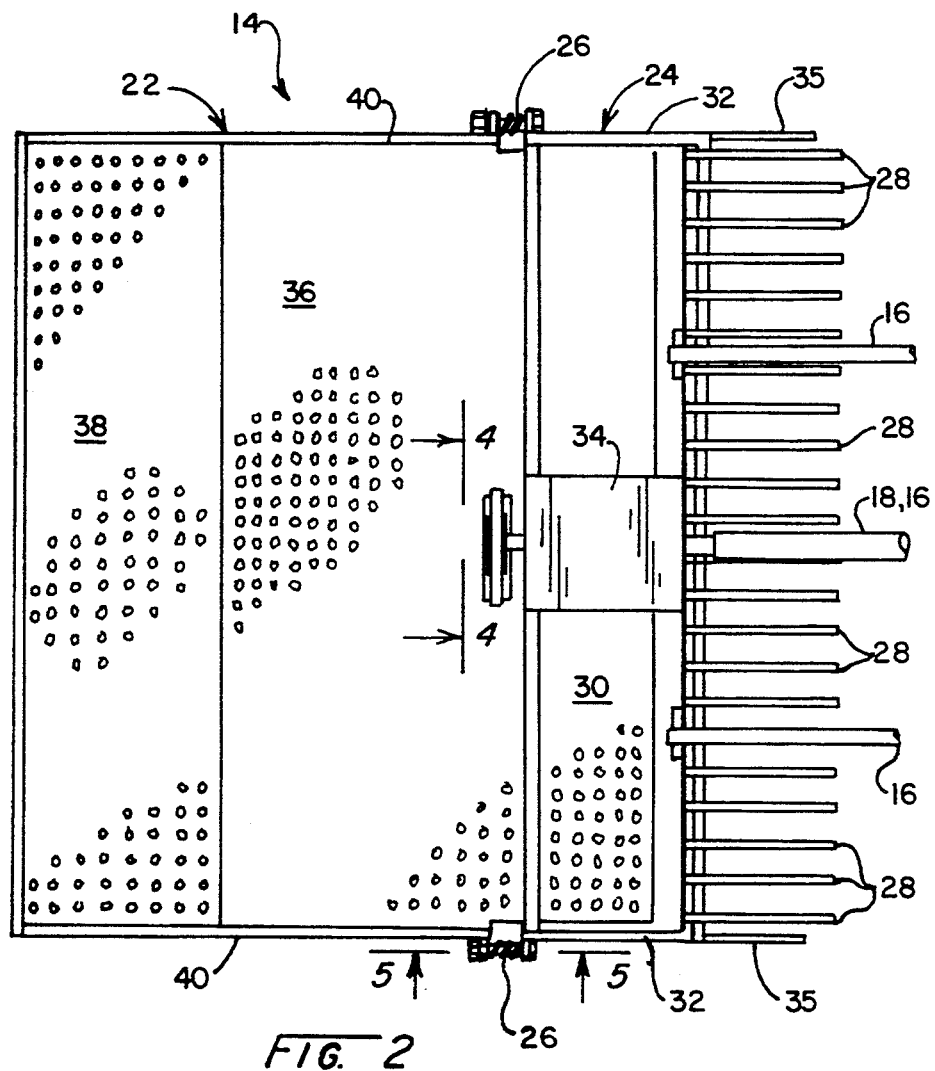
FIG. 2 is a plan view of the joined dragbox sections of FIG. 1.

As better shown in FIG. 2, forward section (24) is provided with multiple and spaced-apart tines or teeth (28) which project downwardly and forwardly from the lowermost leading edge of the section. Teeth (28) are preferably made of a hardened steel and may either be permanently welded to the perforated plate bottom (30) or be made removable as by suitable bolt fasteners.

Section 24 is basically of open configuration at its top and forward and aft ends but is provided with steel plate side members (32) which restrain lateral movement of collected field stones. Forward implement section (24) is also provided with the hereinafter-described vibrator unit (34), and with the side deflectors (35).

Aft dragbox section (22) is also basically of open configuration but only at its top and forward end. Its steel plate bottom elements (36 and 38), like the bottom plate (30) of section (24), are preferably provided with numerous spaced-apart holes or perforations to permit any collected soil to be returned to the earth's surface. Side members (40) restrain lateral movement of collected field stones from within section (22). It should be noted that plate bottom element (38) is, in profile, angled with respect to plate bottom element (36). Such is preferred to improve the efficiency of equipment operation when collected field stones are being dumped at a non-cultivated site. See FIG. 3.

Figure 3:
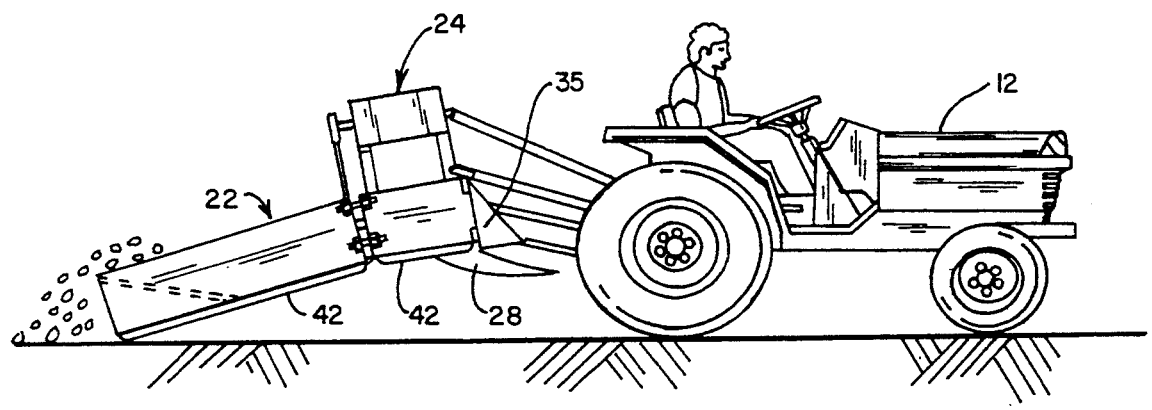
FIG. 3 is a side elevational view of the apparatus of FIG. 1 during a field stone dumping phase of apparatus operation.

FIG. 3 illustrates the implement of my invention in its dumping phase of operation. Basically such is accomplished by actuation of the implement hitch members of farm tractor (12) to elevate forward dragbox section (24) and aft dragbox section (22) with it because of their joined relation. Because of the normal vertical elevation limitations associated with hitch elements (16) it is important that implements sections (22 and 24) be joined in an articulated manner which permits such sections to assume the flexed condition shown in FIG. 3. Also note that steel runners (42) are attached to the underside of each of implement sections (22 and 24) to facilitate forward towing of the implement by tractor (12) with a minimum of drag friction or resistance.

Figure 4:
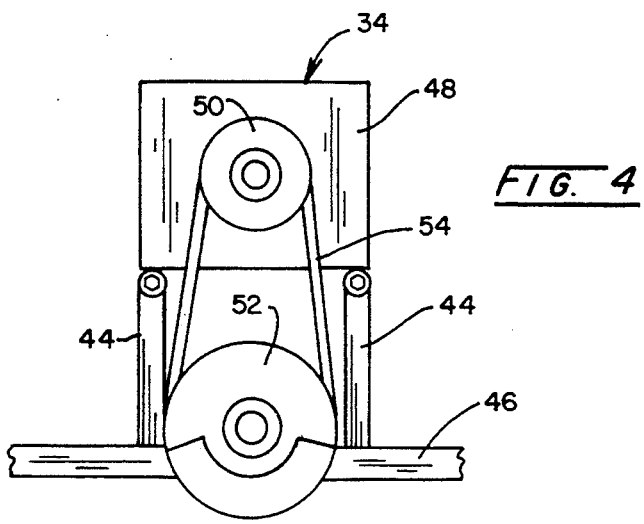
FIG. 4 is an end view of the vibrator component mounted on the forward dragbox section.

FIG. 4 schematically illustrates, in end elevation, details of the vibrator unit (34) which is mounted atop dragbox section (24) and which is operationally coupled to the tractor power take-off shaft (18). Such unit basically is comprised of vertical support members (44) which are each rigidly attached to the frame (46) of plate bottom (30), a gear box (48) secured to support members (44) and driven by shaft (18) as through a universal coupling, an output pulley (50), an eccentric flywheel (52) which is rotatably mounted on frame (46), and a transmission belt (54) which transmits drive forces from pulley (50) to eccentric flywheel (52). The vibratory action desired in dragbox section (24) is achieved by the off-center weight (56) secured to eccentric flywheel (52).

Figure 5:
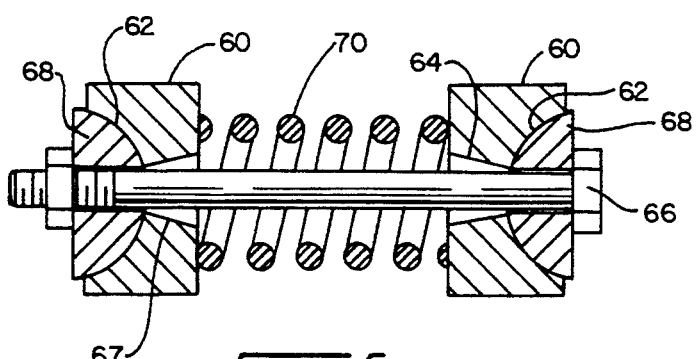
FIG. 5 is a sectional view of one of the fastener means utilized in the field stone collection apparatus of this invention to permit articulation of the joined dragbox sections relative to each other.

Details of a preferred form for coupling assembly (26) are provided in FIG. 5. Each of the ear elements designated (60) is rigidly secured to one of the side members (32 and 40) of their respective dragbox sections (22 and 24), and is provided with both a semi-spherical recess (62) and with a frustro-conical recess (64) which communicates with the semi-spherical recess to provide a through passageway for a heavy-duty threaded bolt (66). Coupling (26) also includes semi-spherical swivels (68) which have openings for bolt (66) to pass through, which engage the semi-spherical recesses in ears (60), and which serve as flat bases for support of the head and threaded nut components of bolt (66). A heavy-duty compression spring (70) is provided in coupling (26) in the manner shown to achieve the desired degree of static separation between ears (60). During elevation of implement assembly (22), (24) in field stone dumping operations, the lowermost couplings (26) on each side of the implement experiences a degree of compression of spring (70) to obtain the articulation illustrated in FIG. 3.

Other materials, component shapes, and component sizes may be utilized in the practice of this invention.

I claim my invention as follows:

1. A farm implement for cooperation with a farm tractor having implement hitch and power take-off accessories and operation to collect field stones which lie on or partially or wholly below the earth's surface, comprising:

a forward dragbox section having open forward and aft ends, a bottom provided with perforations through which unwanted collected materials may be passed to the earth's surface below, multiple spaced-apart stone-engaging teeth projecting downwardly and forwardly from the dragbox section leading end, and hitch points for coupling the section to a farm tractor implement hitch accessory, an aft dragbox section having an open forward end generally aligned with said forward dragbox section aft end, a bottom provided with perforations through which unwanted collected materials received from said forward dragbox section may be passed to the earth's surface below, and an aft end from which collected field stones received from said forward dragbox section are dumped when said aft dragbox section open forward end is elevated, vibrating means mounted upon said forward dragbox section and adapted for connection to and operation by a farm tractor power take-off accessory, and coupling means joining said forward and aft dragbox sections in a manner whereby said sections are rotated relative to each other when said forward dragbox section and said aft dragbox section forward end are elevated by farm tractor implement hitch accessory elevation of said forward dragbox section hitch points.

2. The invention defined by claim 1 wherein said coupling means comprises an elongated fastener extending between said forward and aft dragbox sections, said fastener having limited rotational and axial movement relative to said dragbox sections and having spring means yieldably urging said dragbox sections away from each other to place the fastener in tension.

3. The invention defined by claim 2 wherein a pair of said fasteners in spaced-apart relation is provided to extend between said forward and aft dragbox sections, each adjacent a respective side thereof, and wherein said spring means comprises a compression spring bearing against ends of said forward and aft dragbox sections.

4. The invention defined by claim 3 wherein each said fastener is provided with semi-spherical connections at said each of said forward and aft dragbox sections, said semi-spherical connections providing for said limited rotational movement.

* * * * *